March 24, 1970  R. M. RAMSEY  3,502,363
SELF-BALANCING CRADLE

Filed March 29, 1967  2 Sheets-Sheet 1

INVENTOR.
RAYBURN M. RAMSEY

BY

ATTORNEY

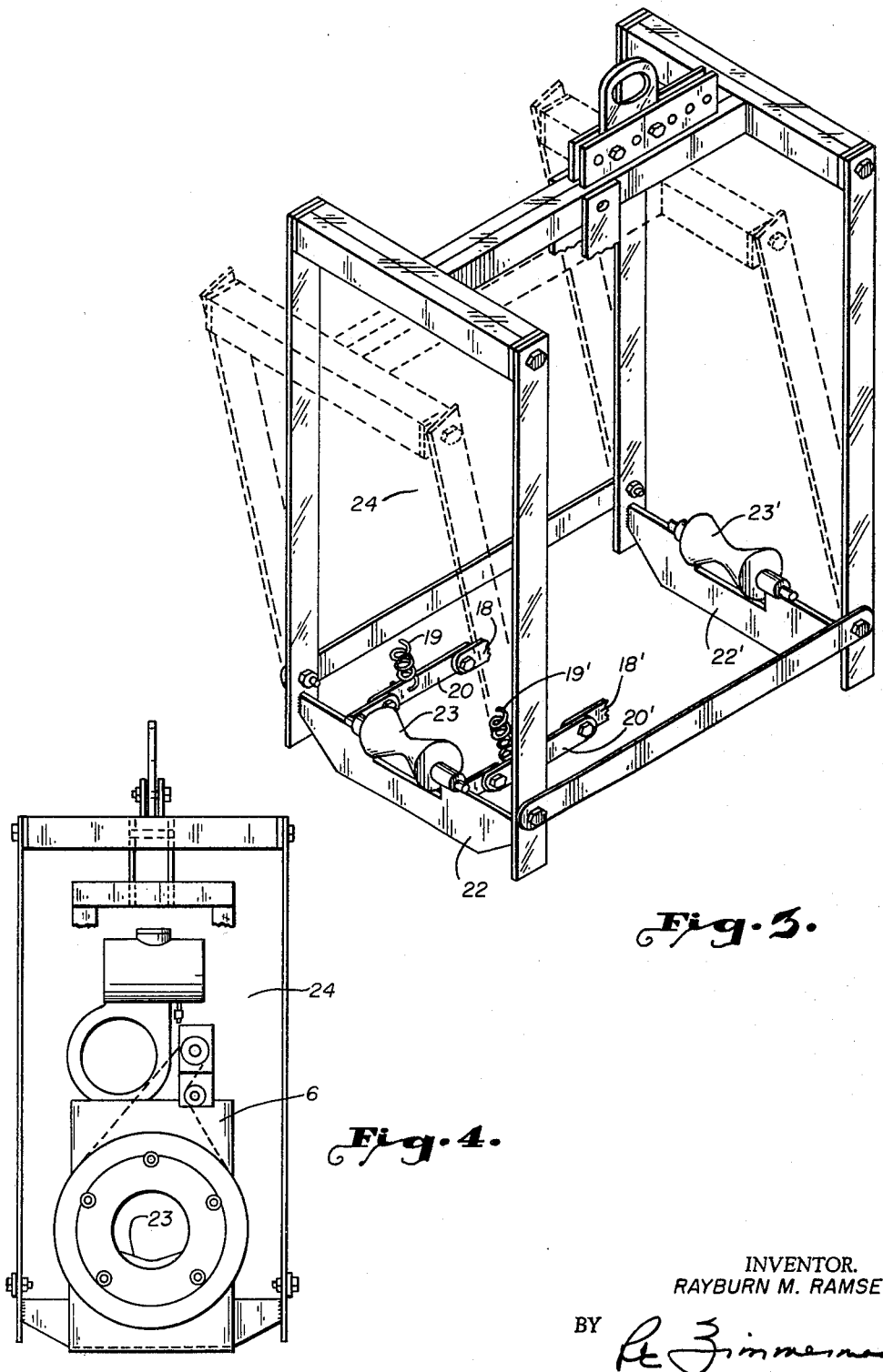

United States Patent Office 3,502,363
Patented Mar. 24, 1970

3,502,363
SELF-BALANCING CRADLE
Rayburn M. Ramsey, Rte. 1, Box 236,
Broken Arrow, Okla. 74012
Filed Mar. 29, 1967, Ser. No. 626,747
Int. Cl. B66c 1/00
U.S. Cl. 294—67
5 Claims

ABSTRACT OF THE DISCLOSURE

A mechanical device used in combination with a cleaning, priming and tape-wrapping machine. This mechanical device is used as a supporting cradle for the machine in field operations. A plurality of rollers support a pipe on a cradle frame which is constructed so as to be self-balancing and permit rotation of the cradle frame as the treating machine progresses along a pipeline.

The present practice of cleaning, priming and tape-wrapping pipe sections being installed in a pipeline now requires a separate cradle for sliding the welded pipe sections into the ground and a bridle for swinging the pipe into position along with a machine for cleaning, priming and tape-wrapping the welded sections of pipe forming the pipeline. This type of operation is tedious, slow and not too efficient, and has limitations which are not present in my invention as my disclosure will show.

So as to improve this operation, I have invented a self-balancing cradle, suitable for use in combination with various types of pipe cleaning, priming and wrapping machines now in use in treating commercial pipe installations. Such pipe-treating machines, which will operate satisfactorily wtih the self-balancing cradle, are available and are manufactured by the Remco Manufacturing Company, Tulsa, Okla. However, although these machines are cited as suitable, it should be understood that the utility of this self-balancing cradle need not be confined to machines manufactured by the above company, but can be used with other machinery which can be adapted to the self-balancing cradle.

The object of this invention is to provide a mechanical device which will support a cleaning, priming and tape-wrapping machine in such a manner so as to afford a balance and ease of movement of the machine as it progresses along a pipeline in its operation.

Another object of this invention is to give the machine being supported in this cradle, balanced movement so that the pipe sections with thin-wall structure are not bent in the cleaning, coating and taping operation.

Still another object of this invention is to provide a means to control the tape wrapping to a close tolerance.

Still another object of this invention is to provide a support means for cleaning, priming and wrapping machines for various diameter piping.

FIGURE 3 shows a perspective view of the self-balancing cradle itself.

FIGURE 4 shows the end view of the complete assembly of the cradle in combination with the cleaning, priming and taping machine.

Figure 1:
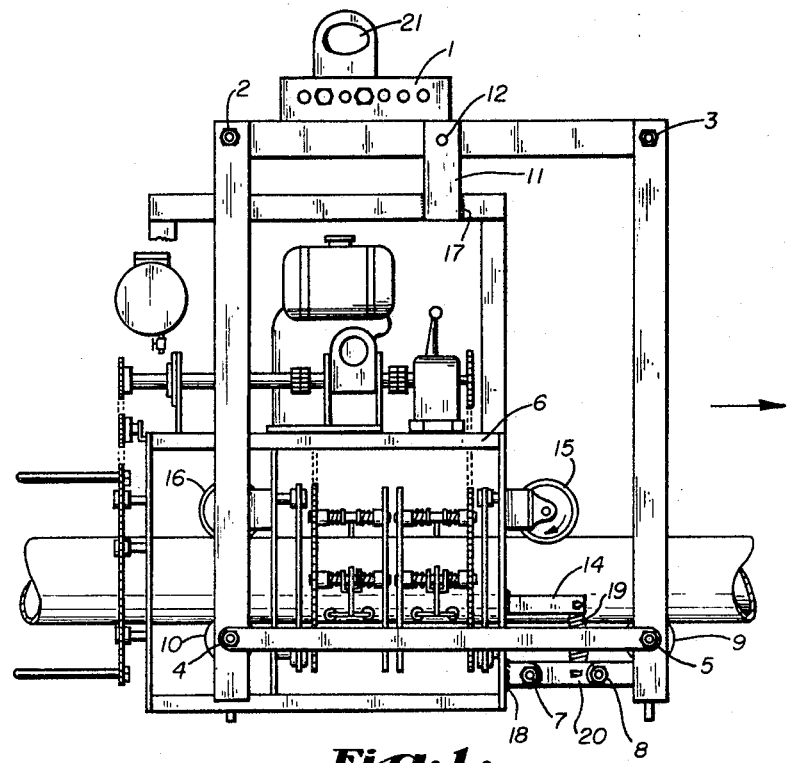
FIGURE 1 illustrates the self-balancing cradle in combination with a cleaning, priming and taping machine.

FIGURE 1 is a side view illustration showing the cradle in a starting balanced position with the pipe-treating machine and a section of pipe in the pipe-treating machine. The frame of the self-balancing cradle is attached at five points to the pipe-treating machine by *a* a guide 11 at point 17 used in storing and transporting the machine to a new location, *b* at points 18 and 18' FIGURE 3, and *c* by springs 19 and 19' extending from the ends of 14 and 14' to the hinged sections 20 and 20'. The guide 11 is bolted in a vertical position at point 12 when being transported. The cradle framing is constructed in such a manner as to permit rotation at points 2, 3, 4 and 5 when the treating machine is operating on the pipeline. The forward movement of the cradle is indicated by the arrow on FIGURE 1. The movement of the wrapping machine is separate and apart from the cradle and the supporting rollers. The wrapping machine is moved along the pipeline by the power wheel 15 and guided by wheel 16 which is shown in contact with the upper surface of the pipe being treated. The initial balance of the machine in combination with the cradle is adjusted by moving the hitch 21 in the block 1 until the complete assembly when suspended from the ground is in an approximate parallel position with the ground surface. This adjustment is maintained by placing and securing two bolts through the block assembly. No further adjustment is necessary.

Figure 2:
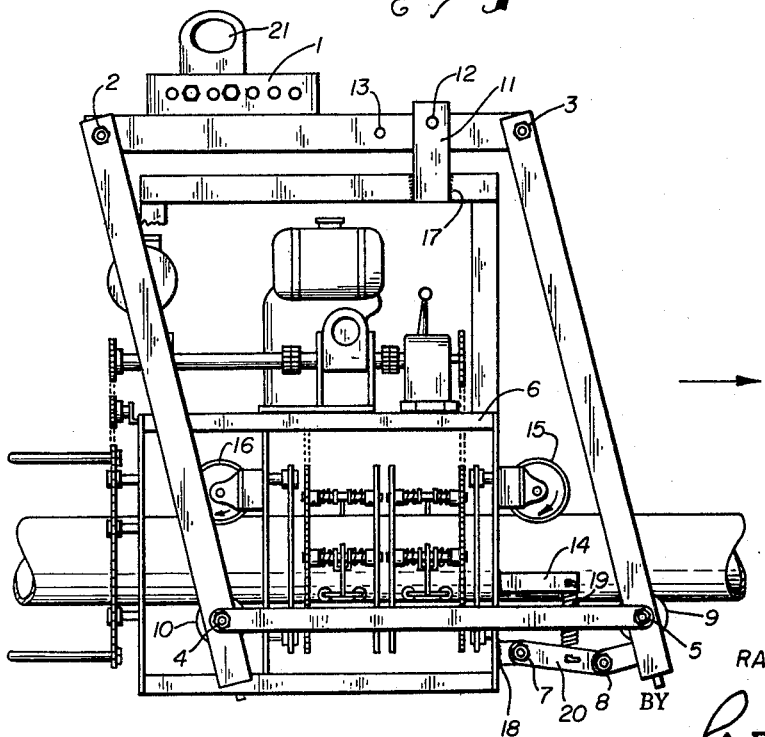
FIGURE 2 illustrates the self-balancing cradle in a forward moving position in combination with a cleaning, priming and taping machine.

FIGURE 2 is a side view of the cradle in combination with the treating machine showing the forward changing position of the cradle as the machine progresses along the pipe line. To move the assembly, the balanced cradle and machine are suspended at 21 as shown in FIGURE 1 from a supporting moving boom (not shown) which carries the cradle in combination with the machine. The cradle itself is constructed with hinged corners at 2, 3, 4 and 5 which gives it flexibility. A spring 19 is suspended between bar members 14 and the hinged bar section 20 to maintain friction between power wheel 15 and the pipe which is being covered. Hinged movement of bar 20 is provided at points 7 and 8. This forms the fulcrum to give flexibility to the entire frame. The top of the cradle has guide 11 with bolt hole 12 for securing the guide to the frame at 13 when the machine is not in use. Guide 11 is welded to the treating machine at 17. Block 1 is shown with bolt holes for adjusting the initial balance of the treating machine and the cradle when the assembly is being mounted on the pipeline. To balance the treating machine in the cradle, it is necessary to suspend the cradle with the treating machine mounted therein by attaching a hook through sliding hitch 21, placing two bolts through the block 1 at a selected position and swinging the load to determine the balance. If not balanced, the sliding hitch 21 is moved to a new position until the machine in the cradle is approximately parallel to the surface of the ground. The entire assembly will remain in equilibrium as the machine powered by the power wheel 15 proceeds along the pipeline. Although FIGURE 2 portrays movement of the cradle only in one direction, it must be understood that the cradle will move equally as well in the opposite direction and still maintain equilibrium in the complete assembly. For optimum operation, the cradle should be repositioned along the pipeline so that machine operation will not be hampered but will move smoothly without interruption. Such an operation is well within the skill of any experienced boom operator.

FIGURE 3 which is a view of the cradle per se 24 shows the structural features including the bottom braces 22 and 22' supporting the rollers 23 and 23' over which the pipe slides as the treating process proceeds along the pipeline. The connecting hinged braces 20 and 20' are attached to the braces 22 and 22', the springs 19 and 19' are extended to braces 14 and 14' as shown in FIGURE 1.

FIGURE 4 shows an end view relating the positioning of the pipe rollers 23 in relation to the treating machine 6 and the cradle 24. The tapered surface of the rollers 23 and 23' FIGURE 3 are designed so as to handle pipe sizes with a diameter of 1½ inch to 42 inches. In this assembly, the rollers themselves can be positioned very close to the power wheel 15 and the guide wheel 16 FIGURE 1 with this cradle. This feature is not found in other pipe line treating machines with different types of supporting structures.

OPERATION

To place the assembly in operation, the lower section of the self-balancing cradle is positioned below the pipe to be treated. The cleaning, priming and taping machine is mounted above and around the pipe with the power wheel and the guide wheel of the machine on the upper surface of the pipe as shown in FIGURE 1. A bolt which is inserted through the frame and attaching bar 12 and 13 FIGURE 2 to give the machine vertical support is removed. The springs 19 and 19′ FIGURE 3 are placed in position as shown to provide frictional contact between the pipe being wrapped and the power wheel 15 FIGURE 1. The machine assembly after balancing as described in the preceding paragraph is ready for operation. As the machine proceeds to clean, prime and wrap the pipe, the power wheel moves the machine in a horizontal direction. As the machine moves along the pipe, the cradle frame flexes in the direction as shown in FIGURE 2. The flexibility of the frame structure allows the machine to move with ease approximately parallel to the ground surface independent of the frame. In the preferred embodiment, when approximately half the length of the wrapping machine has moved forward, the side boom with a cable attached is put into operation to move the cradle and the machine to restore it to a position as shown in FIGURE 1, or to a position opposite to that shown in FIGURE 2.

Summarizing, this new and improved flexible cradle in combination with a cleaning, priming and taping machine affords a means to wrap pipe sections with as small a lap dimension as ⅛ inch in the pipe wrapping. Previously, because of the lack of complete structure compactness, unity and control of the wrapping machine and other necessary equipment, the lap wrap dimension was not uniform and previously required a larger lap to insure complete coverage. With the self-balancing cradle in combination with the wrapping machine, greater uniformity can be maintained in the lap-wrap dimension while still maintaining a minimum dimension in the lap.

I claim:
1. For use with a pipe-treating machine, a self-balancing cradle, the said cradle consisting of a metal frame with pivot means at each of the corners, roller means in the lower section of the frame for supporting a pipe section, a first set of metal hinged bar members attached to the pipe-treating machine, the said bar members being positioned below a second set of metal bars attached to the pipe treating machine, the second set of bar members being connected above the first-mentioned set of bar members by spring means suspended and attached between the first-mentioned hinged bar members and the extremities of the said second set of bar members, metal bar means for guiding the pipe-treating machine in the upper section of the frame cradle, and adjustable hitching means attached to the upper section of the frame cradle.

2. The self-balancing cradle as claimed in claim 1 where the first-mentioned hinged bar has two hinges and the said springs are attached approximately midway between the two said hinges.

3. The self-balancing cradle as claimed in claim 1 where each of the two first-mentioned hinged bars are positioned and attached to the lower extremities of the said cradle one on each side of the said roller means.

4. The self-balancing cradle as claimed in claim 1 where the said roller means is tapered toward the middle of the rollers so as to accommodate small and large size pipe.

5. The self-balancing cradle as claimed in claim 1 where the hitching means attached to the upper section of the frame cradle consists of two drilled plates with a hitching plate slidably mounted therein and means to hold the hitching plate in place between the said drilled plates.

References Cited

UNITED STATES PATENTS

| | | | |
|---|---|---|---|
| 2,559,703 | 7/1951 | Bergman. | |
| 2,581,971 | 1/1952 | Perrault | 294—67 |
| 3,258,287 | 6/1966 | Crosby. | |

SAMUEL W. ENGLE, Primary Examiner

U.S. Cl. X.R.

214—1